(12) United States Patent
Perolini

(10) Patent No.: US 11,000,901 B2
(45) Date of Patent: May 11, 2021

(54) PROCESS FOR THE PRODUCTION OF CONTAINERS FOR COSMETIC PRODUCTS

(71) Applicant: O.M.Z. OFFICINA MECCANICA ZANOTTI S.p.A., Crema (IT)

(72) Inventor: Pietro Perolini, Lugano (CH)

(73) Assignee: O.M.Z. OFFICINA MECCANICA ZANOTTI S.P.A., Crema (IT)

(*) Notice: Subject to any disclaimer, the term of this patent is extended or adjusted under 35 U.S.C. 154(b) by 0 days.

(21) Appl. No.: 16/465,335

(22) PCT Filed: Oct. 13, 2017

(86) PCT No.: PCT/IB2017/056351
§ 371 (c)(1),
(2) Date: May 30, 2019

(87) PCT Pub. No.: WO2018/100448
PCT Pub. Date: Jun. 7, 2018

(65) Prior Publication Data
US 2019/0388975 A1    Dec. 26, 2019

(30) Foreign Application Priority Data

Nov. 30, 2016    (IT) .......................... 102016000121240

(51) Int. Cl.
*B23B 5/08*    (2006.01)
*A45D 34/04*    (2006.01)
(Continued)

(52) U.S. Cl.
CPC .............. *B23B 5/08* (2013.01); *A45D 34/043* (2013.01); *A45D 34/045* (2013.01);
(Continued)

(58) Field of Classification Search
CPC ... B23B 5/08; B23B 1/00; B23P 15/00; C25D 11/04; A45D 34/043; A45D 34/045;
(Continued)

(56) References Cited

U.S. PATENT DOCUMENTS 4,921,366 A * 5/1990 Hurrell ................. A45D 40/06
220/23.87
2003/0106201 A1* 6/2003 Holloway ................ B44F 1/02
29/527.2

(Continued)

FOREIGN PATENT DOCUMENTS

| FR | 2843099 A1 | 2/2004 |
|---|---|---|
| JP | 63293196 A * | 11/1988 |
| JP | S63293196 A | 11/1988 |

OTHER PUBLICATIONS

PCT Search Report and Written Opinion from PCT/IB2017/056351 dated Apr. 17, 2018 (15 pages).

*Primary Examiner* — Bayan Salone
(74) *Attorney, Agent, or Firm* — Pearne & Gordon LLP

(57) ABSTRACT

Process for the production of containers for cosmetic products, comprising the steps of: providing a first bar made of metal or metal alloy; turning said first bar to obtain an element (2) having a tubular shape and defining internally a housing compartment (3); anodizing said element (2) to obtain a surface finishing processing; and inserting a cylindrical body (9) for containing a cosmetic product inside said housing compartment (3).

6 Claims, 2 Drawing Sheets

(51) Int. Cl.
*A45D 40/26* (2006.01)
*C25D 11/04* (2006.01)
*A45D 40/00* (2006.01)

(52) U.S. Cl.
CPC ......... *A45D 40/264* (2013.01); *A45D 40/265* (2013.01); *C25D 11/04* (2013.01); *A45D 2040/0012* (2013.01)

(58) Field of Classification Search
CPC .... A45D 40/264; A45D 40/265; A45D 40/00; A45D 2040/0012
See application file for complete search history.

(56) References Cited

U.S. PATENT DOCUMENTS

| | | | | |
|---|---|---|---|---|
| 2013/0160964 A1* | 6/2013 | Hahn | ........................ | F02F 1/00 164/69.1 |
| 2014/0047959 A1* | 2/2014 | Mann | ..................... | B23B 27/22 82/1.11 |

* cited by examiner

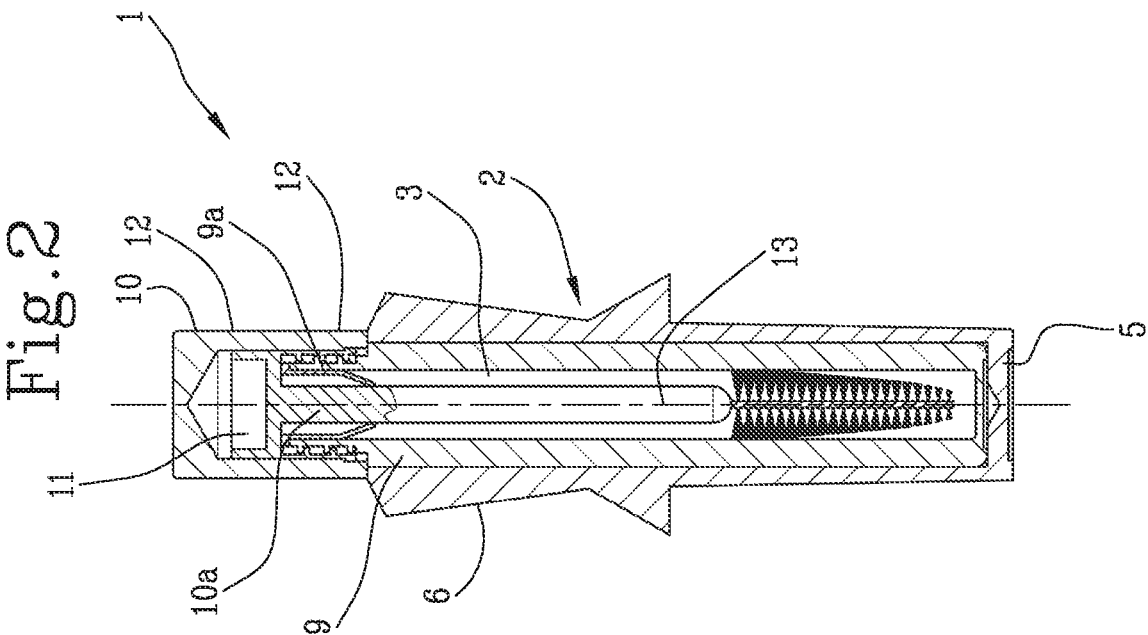
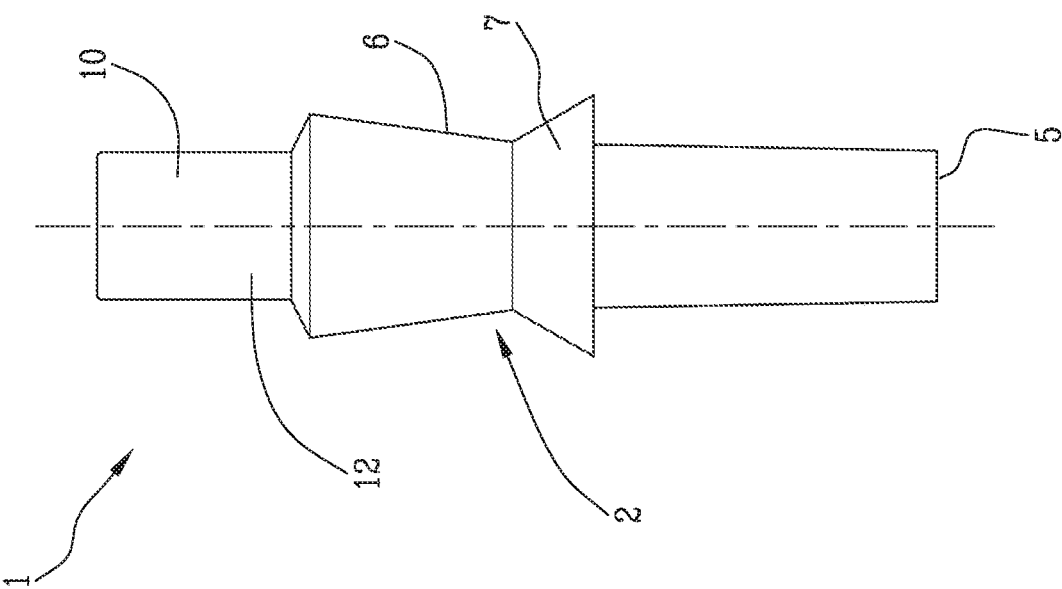

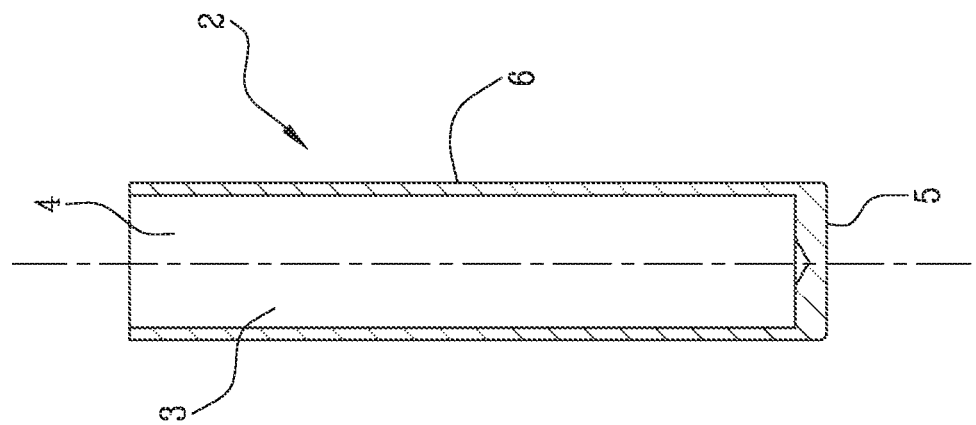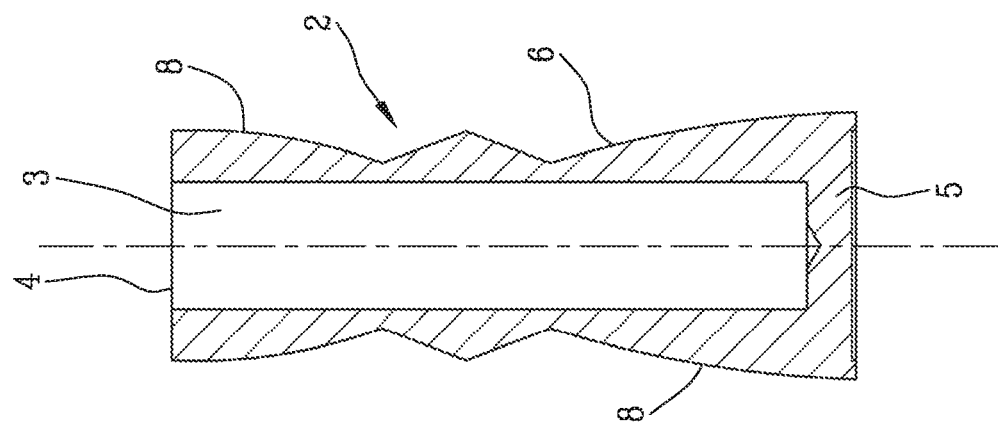

PROCESS FOR THE PRODUCTION OF CONTAINERS FOR COSMETIC PRODUCTS

The present invention relates to a process for production of containers for cosmetic products.

In particular, the present invention relates to a process for the production of containers and a respective container specifically used in the cosmetic field for the retention of liquid, semi-liquid or pasty products, such as mascara, lip gloss, lipsticks, enamels, etc.

As known, containers for cosmetic products, for example those made for the retention of mascara, consist of a substantially cylindrical body, generally made of plastic and defining internally a containment chamber of the cosmetic product.

The body has a closed bottom end and an open upper end for accessing the containment chamber of the product. From the open end a threaded collar emerges for the coupling of a respective closure cap. Generally, the cap is associated with an applicator brush, immersed in the product in the closure condition of the container, and is capable of retaining the cosmetic product and distributing it to the affected part (eyelashes, in the case of mascara).

The body also has an outer surface properly shaped and provided with writing, logos or other chromatic/ornamental effects suitable to give the whole product a particular aesthetic effect.

Such an aesthetic effect is however limited to the structure and material of the cylindrical body. In this respect, it should be considered that the plastic material used for the production of the body must necessarily have specific characteristics suitable not to alter the chemical composition of the cosmetic product contained in the body itself, shall be the cosmetic product impaired.

Consequently, the selection of materials is limited, as well as the possibility of obtaining different aesthetic effects.

For this reason, there are provided cover elements to be coupled to the outer surface of the cylindrical body.

In this way, while the cylindrical body can be made of a material suitable for containing the cosmetic product but without any particular aesthetic features, the cover element is specially designed to give a greater ornamental value to the entire product.

Accordingly, cover elements also having a predominantly cylindrical conformation and being internally hollow to hold the body are manufactured.

These elements are made of metallic material (or similar materials) which can have multiple solutions in terms of external colouring or shaping.

To obtain the desired shape, the cover elements are obtained by a moulding or drawing process starting from a sheet of metal material.

In particular, according to the shape to be obtained, the moulds are properly arranged to plastically deform the metal sheet, thus obtaining the internally hollow cylindrical conformation. In addition, this process allows to obtain ornamental patterns on the outer surface of the cover element.

However, this process, although capable of obtaining cover elements provided with particular ornamental effects, has important drawbacks.

It should be considered that a sheet of very thin metal is used to facilitate the aforementioned shaping moulding or drawing processes of the element. In this way, the plastic deformation of the sheet takes place in a quicker and simpler way, and thus becomes much less expensive.

However, the use of a very thin sheet appears to be limiting in terms of material selection and for the production of very different products and which may also require higher thicknesses of the container.

It should also be considered that the printing of the cover element is a non-versatile process, as it involves the production of suitably shaped moulds.

Consequently, for each modification in the shaping of the cover element, it is associated a change of the respective moulds with the resulting disadvantages in terms of general costs of production of each container.

The object of the present invention is therefore to provide a process for the production of containers for cosmetic products which is capable of solving the above-mentioned problems.

In particular, an object of the present invention is to provide a process for the production of containers for cosmetic products that is versatile and capable of being adaptable, in a simple and cheap way, to the various aesthetic characteristics that the container must exhibit.

In addition, it is an object of the present invention to provide a process that is simple, fast, cost-effective and obtainable by using any metallic material. It does not require significant investments for the production of moulds for high volumes, but it is very versatile for low volumes.

Finally, another object of the present invention is to provide a process for manufacturing a container for cosmetic products having high qualitative characteristics as well as a valuable ornamental effect.

The mentioned technical task and the specified aims are substantially achieved by a process for manufacturing a container for cosmetic products, including the technical specifications set out in one or more of the appended claims.

Further characteristics and advantages of the present invention will become more apparent from the description of an exemplary, but not exclusive, and therefore non-limiting preferred embodiment of a process for the production of containers for cosmetic products of the type illustrated in the appended figures, wherein:

FIG. 1 shows a side elevational view of a container for cosmetic products manufactured with the process according to the present invention;

FIG. 2 is a longitudinal sectional view of the container of FIG. 1;

FIG. 3 is a longitudinal sectional view of a part of the container of FIG. 1 according to a second embodiment shown as an example; and FIG. 4 is a longitudinal sectional view of a part of the container of FIG. 1 according to a third embodiment shown as an example.

With reference to the appended figures, reference numeral 1 refers, as a way of example, to a container for cosmetic products obtained by the process of the present invention.

In particular, the process comprises the step of providing a first bar made of metal or metal alloy and then turning the first bar to obtain an element 2 having a tubular shape and defining internally a housing compartment 3.

In particular, a first bar is prepared, preferably in aluminium alloy or another material having the same structural characteristics.

The manufacturing process involves a turning step of an inner area of the first bar to define said compartment 3 having a cylindrical shape and defining an access opening 4 of the compartment and a closed end 5 opposite to the access opening 4.

The turning operation further involves the step of turning an outer surface 6 of the first bar to define an external silhouette of the tubular element 2.

In particular, as better illustrated in the accompanying FIGS. 1 to 4, for merely exemplary and therefore non-limiting purposes, the outer surface 6 may have any shape according to the desired aesthetic aspect of the container 1.

Note, for example, that in FIGS. 1 and 2, the first bar is turned to define an outer surface 6 having a variable section along the longitudinal development. This variable section defines in particular a central collar 7 protruding with respect to the rest of the surface.

Similarly, the first bar may be turned to provide on the outer surface 6 a configuration determined by end portions 8 bent towards the inside. This configuration is better illustrated in the cut through of FIG. 3, wherein an element 2 is represented according to a different embodiment solution.

Still, the first bar can be turned to define a cylindrical outer surface 6 (FIG. 4) with a circular section, and therefore having a constant section throughout the longitudinal development.

In other words, the turning step is implemented in order to define any external configuration of the element 2, realizing surfaces 6 that can exhibit different aesthetic effects.

After the turning step, the element 2 thus obtained undergoes an anodizing step to achieve a finishing process of the surface.

This anodizing step is carried out to give a specific external ornamental appearance, such as a specific stain of the outer surface 6 of the element 2.

Finally, it is inserted a cylindrical body 9 for containing the cosmetic product inside said housing compartment 3 (FIG. 2).

The cylindrical body 9 is preferably made of a plastic material suitable for containing cosmetic products without altering their chemical characteristics.

In addition, the cylindrical body has dimensions suitable to be contained in the compartment 3 and engaged inside the compartment 3 by mechanical interference.

The step of inserting the cylindrical body 9 into the compartment 3 is accomplished by inserting the body 9 through the access opening 4 so as to project at least a threaded neck 9a of the cylindrical body 9 out of the housing compartment 3.

In this way, a closure cap 10a is advantageously provided to be engaged with the threaded neck 9a of said cylindrical body 9.

The closure cap 10a is produced by providing a second bar made of metal or metal alloy, preferably in aluminium alloy.

Subsequently, the second bar is turned to obtain a cap 10 defining internally a housing compartment 11.

Also in this case, the turning step provides a sub-step of turning an inner zone of the second bar to define the compartment 11 countershaped to the cap 10a and turning an outer surface 12 of the second bar to define an outer shape of the cap 10.

Even in this case, the turning steps allow to obtain any shape and dimension of the outer surface 12 from a full bar.

By way of example, FIGS. 1 and 2 show a cap 10 having a cylindrical shape with a circular section.

In addition, as for the element 2, the cap 10 is also anodized to obtain a finishing process of the surface, such as the colouring of the external surface 12.

Finally, the cap 10a is inserted inside the compartment 11 of the cap.

As illustrated in FIG. 2, wherein a container 1 for mascara is exemplified, the cap 10a may be provided with an applicator 13 of the cosmetic product, such as a brush that is inserted into the body 9 in the closure condition of the cap.

At the end of the above-described steps, or in any case, once the bars are turned to obtain the element 2 and the cap 10, further surface processing steps may be provided for applying writings or other ornamental motifs on the respective outer surfaces 6, 12.

The above-disclosed method and the container 1 thus obtained have important advantages.

First, the turning steps from full bars allow to adapt the production of the single container 1 to different production needs.

In fact, the process does not require the preparation of moulds, but only the programming of appropriate turning steps to produce products having any shape.

In other words, the turning step of bars is simple and very cheap because it does not involve the study, preparation, design and manufacture of moulds, and does not necessarily need to be carried out with metal sheets of a predetermined thickness.

Consequently, this step is very versatile as it allows to easily adapt and modify, therefore in a cheap way, the outer shape of the container 1 even for low quantities.

In addition, the turning step enables the production of tubular elements 2 housing the plastic bodies 9 for containing the cosmetic product with different thicknesses.

In fact, the bar is internally turned in order to produce the compartment 3 and thereby determining a thickness of the tubular element 2 capable of adapting to the different needs. Such thickness can also be high to give a better aesthetic and qualitative value to the completed container 1.

Lastly, the metallic material (aluminium alloy or other) is very durable and, at the same time, has very versatile characteristics in terms of adaptability to the different surface finishes.

The invention claimed is:

1. Process for the production of containers for cosmetic products, comprising the steps of:
    providing a first bar made of metal or metal alloy;
    turning said first bar to obtain an element (2) having a tubular shape and defining internally a housing compartment (3), said turning step comprising sub-steps of turning an inner area of the first bar to define said compartment (3) having a cylindrical shape and defining an opening (4) for access to the compartment (3) and a closed end (5) opposite the access opening, and turning an outer surface (6) of the first bar to define an external silhouette of the element (2);
    anodizing said element (2) to obtain a surface finishing processing; and
    inserting a cylindrical body (9) for containing a cosmetic product inside said housing compartment (3) through the access opening (4) to expose a threaded neck (9a) of the cylindrical body (9) outside of the housing compartment (3); and
    providing a second bar made of metal or metal alloy;
    turning said second bar to obtain a cap (10) defining internally a housing compartment (11);
    anodizing said cap (10) to obtain a surface finishing process; and
    inserting a closure plug (10a) inside said housing compartment (11), said plug (10a) being engageable with the threaded neck (9a) of said cylindrical body (9).

2. Process according to claim 1, characterized in that said step of anodizing the element (2) comprises the sub-step of conferring predefined colouring and hardness at least to the outer surface (6) of said element.

3. Process according to claim 1, characterized in that said turning step of the second bar comprises the sub-steps of:
- turning an inner area of the second bar to define said compartment (11) shaped complementarily to said plug (10*a*);
- turning an outer surface (12) of the second bar to define an outer shape of the cap (10).

4. Process according to claim 1, characterized in that said step of anodizing the cap (10) comprises the sub-step of conferring predefined colouring and hardness at least to the outer surface (12) of said cap (10).

5. Process according to claim 1, characterized in that said bar is made of aluminium alloy or other ferrous and non-ferrous material.

6. Container for cosmetic products obtained by the process described in claim 1.

* * * * *